(12) United States Patent
Baumann et al.

(10) Patent No.: US 9,316,126 B2
(45) Date of Patent: Apr. 19, 2016

(54) METHOD FOR DETERMINING A PHASE POSITION OF AN ADJUSTABLE CAMSHAFT

(71) Applicants: Torsten Baumann, Eppingen-Adelshofen (DE); Oliver Krannich, Tamm (DE); Andreas Lassl, Ditzingen (DE)

(72) Inventors: Torsten Baumann, Eppingen-Adelshofen (DE); Oliver Krannich, Tamm (DE); Andreas Lassl, Ditzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 226 days.

(21) Appl. No.: 13/955,496

(22) Filed: Jul. 31, 2013

(65) Prior Publication Data

US 2014/0034000 A1  Feb. 6, 2014

(30) Foreign Application Priority Data

Aug. 1, 2012  (DE) .......................... 10 2012 213 539

(51) Int. Cl.
| | |
|---|---|
| *F02D 13/02* | (2006.01) |
| *F01L 1/344* | (2006.01) |
| *F02D 41/00* | (2006.01) |
| *G01D 5/14* | (2006.01) |
| *F02D 41/14* | (2006.01) |

(52) U.S. Cl.
CPC .............. *F01L 1/344* (2013.01); *F02D 41/009* (2013.01); *G01D 5/142* (2013.01); *F01L 2800/05* (2013.01); *F01L 2820/041* (2013.01); *F02D 13/0238* (2013.01); *F02D 2041/1433* (2013.01); *F02D 2200/021* (2013.01); *F02D 2200/101* (2013.01); *F02D 2200/503* (2013.01); *F02D 2250/12* (2013.01); *F02D 2250/14* (2013.01)

(58) Field of Classification Search
CPC .. F01L 1/344; F01L 2820/041; F02D 41/009; F02D 13/02; F02D 13/0238; F02D 2250/14
USPC ......... 123/90.15, 90.31, 90.17; 701/103, 107, 701/110
See application file for complete search history.

(56) References Cited

U.S. PATENT DOCUMENTS

| | | | |
|---|---|---|---|
| 6,644,257 B2 * | 11/2003 | Kunz et al. ................. | 123/90.17 |
| 7,912,624 B2 * | 3/2011 | Schafer et al. ............... | 701/105 |
| 7,930,093 B2 * | 4/2011 | Bauer et al. .................. | 701/114 |
| 7,954,466 B2 * | 6/2011 | Nguyen et al. ............. | 123/90.17 |
| 8,132,549 B2 * | 3/2012 | Dell et al. .................. | 123/90.15 |
| 2008/0284414 A1 * | 11/2008 | Giovanardi et al. ....... | 324/207.2 |

FOREIGN PATENT DOCUMENTS

| | | |
|---|---|---|
| DE | 41 41 714 | 7/1993 |
| DE | 102 32 353 | 1/2004 |
| EP | 1 073 843 | 2/2001 |
| EP | 1 673 528 | 6/2006 |
| WO | WO99/54622 | 10/1999 |
| WO | WO 2005/038225 | 4/2005 |

* cited by examiner

*Primary Examiner* — Hai Huynh
(74) *Attorney, Agent, or Firm* — Kenyon & Kenyon LLP

(57) ABSTRACT

A method for determining a phase position of an adjustable camshaft of an internal combustion engine having a sensor wheel and a camshaft adjuster. The phase position of the camshaft is determined on the basis of phase flank interrupts triggered by the sensor wheel and a model which depends on at least one performance characteristic of the camshaft adjuster.

10 Claims, 3 Drawing Sheets

METHOD FOR DETERMINING A PHASE POSITION OF AN ADJUSTABLE CAMSHAFT

RELATED APPLICATION INFORMATION

The present application claims priority to and the benefit of German patent application no. 10 2012 213 539.1, which was filed in Germany on Aug. 1, 2012, the disclosure of which is incorporated herein by reference.

FIELD OF THE INVENTION

The present invention relates to a method for determining a phase position of an adjustable camshaft of an internal combustion engine, which includes a sensor wheel and a camshaft adjuster, characterized in that the phase position of the camshaft is ascertained on the basis of phase flank interrupts triggered by the sensor wheel and a model, which depends on at least one performance characteristic of the camshaft adjuster.

BACKGROUND INFORMATION

The phase position of the camshaft in relation to a crankshaft may be ascertained by a sensor wheel mounted on the camshaft. This sensor wheel has teeth, which are scanned by a Hall sensor, for example, when the camshaft rotates. Whenever the beginning of a tooth is detected, for example, a phase flank interrupt is triggered in an engine control unit. Sensor wheels having four teeth of different lengths are generally used on a camshaft. This special profile permits faster synchronization between the camshaft and the crankshaft and thus makes it possible to start the internal combustion engine more rapidly. As a special feature, such a sensor wheel also has four tooth flanks which are equidistant and with which an actual angular position of the camshaft is determined. A camshaft regulator sits in the actual angular position of the camshaft.

At low rotational speeds, for example, 1000 rpm, there is a new value for the actual angular position of the camshaft every 30 ms. If the phase position of the camshaft is to be adjusted rapidly, for example, with an adjustment period of less than 160 ms, then too few measuring points for the actual angular position of the camshafts are available accordingly. The speed of the camshaft between two phase flank interrupts is therefore determined and the actual angular position of the camshaft until arrival of the next phase flank interrupt is extrapolated linearly. In the case of changes in gradient of the phase position between the camshaft and the crankshaft in particular, severely overestimated or underestimated actual angular positions of the camshaft may be obtained with this method, which entails corresponding disadvantages for the control quality of the camshaft adjuster.

A sensor wheel having a larger number of teeth would trigger more phase flank interrupts per given time interval, which would require more computing capacity on the part of the engine control unit. The rapid synchronization between the camshaft and the crankshaft as achieved by a sensor wheel having four teeth of different lengths also could not be achieved with a sensor wheel having a large number of teeth.

SUMMARY OF THE INVENTION

The method according to the present invention having the features described herein has the advantage over the related art that the phase position of a camshaft is determined in relation to a crankshaft on the basis of phase flank interrupts triggered by a sensor wheel and of a model. This model depends on the value of at least one performance characteristic of the camshaft adjuster.

The term "camshaft adjuster" and the mechanical portion of an adjustment mechanism, which adjusts the camshaft, i.e., hydraulic components, for example, as well as corresponding control components, e.g., in the form of an electronic controller are to be included below.

The actual angular position of the camshaft or crankshaft is to be understood below to be an angle of rotation of the camshaft or crankshaft with respect to a hypothetical fixed preferential direction in space, which is perpendicular to an axis of rotation of the camshaft and the crankshaft. This imaginary preferential direction may be a plumb line, for example. The phase position of the camshaft in relation to the crankshaft corresponds to the difference in the actual angular positions of the camshaft in relation to the angular position, which a nonadjustable camshaft would have at the same point in time.

The phase position of the camshaft in relation to the crankshaft may be determined at any desired point in time with high precision, even if there is no phase flank interrupt. This improves the control quality of the camshaft and permits a rapid camshaft adjustment without requiring a sensor wheel having a greater number of teeth.

Additional advantages are derived with regard to the control quality of a high-pressure control of a high-pressure pump, which requires improved knowledge of the phase position of the camshaft in relation to the crankshaft. Thus, rapid activation and deactivation of the high-pressure pump are made possible, for example, reducing the noise generated by the high-pressure pump.

The at least one performance characteristic of the camshaft adjuster is advantageously an input variable of the camshaft adjuster, for example, an oil temperature, an oil quality, a water temperature, a rotational speed of the internal combustion engine or an internal control variable, such as that prevailing within the camshaft adjuster, for example, a battery voltage, an operating point of a regulated oil pump, a pulse duty factor or a trigger value of the mechanical component of the camshaft adjuster.

However, the at least one performance characteristic of the camshaft adjuster may also be a physical variable, which does not change over time and which has an effect on the camshaft adjuster. This may advantageously be, for example, a chamber volume, an oil flow characteristic, an inductance or an electrical resistance of a trigger valve. The preceding list makes no assertion of being complete.

It is also advantageous that the method according to the present invention may be implemented in existing systems to improve the phase position determination of the camshaft in relation to the crankshaft without necessitating expensive modifications of the internal combustion engine.

Advantageous refinements and improvements of the method described herein are possible through the measures enumerated in the further descriptions herein.

The phase flank interrupts triggered by the sensor wheel are advantageously used for synchronization of the at least one performance characteristic of the camshaft adjuster.

It is advantageous in particular to determine the phase position of the camshaft at points in time which are between the points in time of two phase flank interrupts by extrapolation with the aid of the model which depends on at least one performance characteristic of the camshaft adjuster.

The problem defined at the outset is also solved by a computer program which is configured to execute each step of a generic method according to the description herein.

The problem defined at the outset is also solved by an electronic memory medium on which the computer program is stored for performing all steps of the generic method according to the description herein as well as by an electronic control unit which includes the electronic memory medium.

An exemplary embodiment of the present invention is explained in greater detail below on the basis of the accompanying drawings.

DETAILED DESCRIPTION

Figure 1:
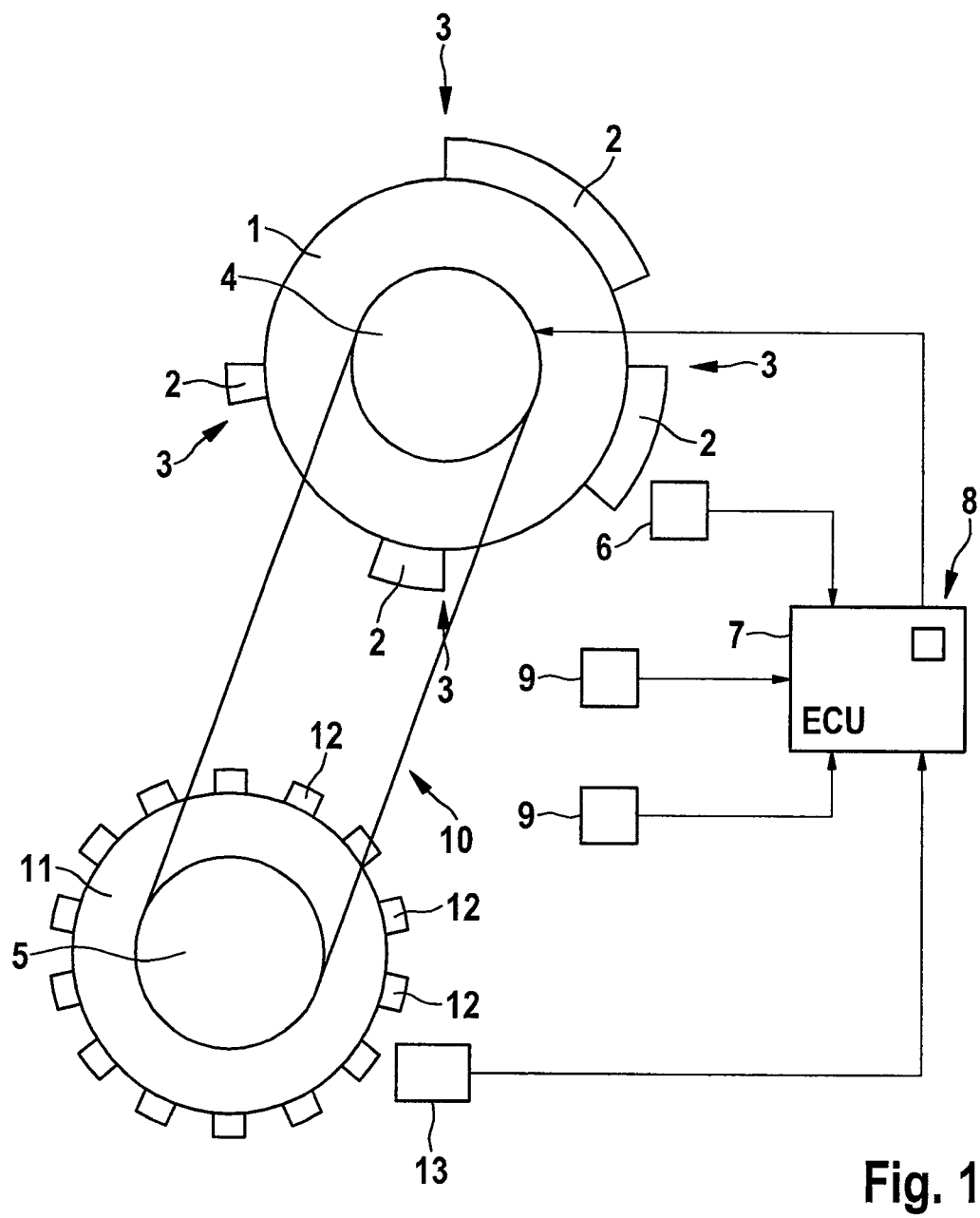
FIG. 1 shows a schematic diagram of a camshaft and crankshaft of an internal combustion engine having a sensor wheel mounted on the camshaft.

FIG. 1 schematically shows an adjustable camshaft 4 having a sensor wheel 1 of an internal combustion engine (not identified in detail in the drawing). Sensor wheel 1 is mounted concentrically on camshaft 4 and has four teeth 2 of different lengths, the teeth being situated in such a way that four tooth flanks 3 are equidistant from one another. A sensor wheel having such a tooth configuration is also known as a fast-start sensor wheel. Alternatively, other embodiments of sensor wheel 1 of camshaft 4 are also conceivable. The camshaft adjuster is not shown in detail in the drawing.

If camshaft 4 and thus sensor wheel 1 rotate, then teeth 2 are moved past a Hall sensor 6 which detects the beginning and end of teeth 2 and sends a signal to an engine control unit 7, where a phase flank interrupt is triggered by a detected beginning of a tooth 2 and/or a detected end. Engine control unit 7 includes an electronic memory medium 8. Instead of a Hall sensor, a sensor which operates by a different principle, for example, an inductively operating sensor, may also be used as an alternative.

If a phase flank interrupt occurs, this may be used to determine the actual angular position of camshaft 4 and thus the phase position of camshaft 4 in relation to crankshaft 5 if the actual angular position of crankshaft 5 is known.

A sensor wheel 11 which is assembled with teeth 12 is also situated concentrically to crankshaft 5. A Hall sensor 13 registers teeth 12 passing by it when crankshaft 5 is rotating. The signal of Hall sensor 13 is transmitted to engine control unit 7 where the actual angular position of crankshaft 5 is calculated therefrom. Sensor wheel 11 mounted on crankshaft 5 usually has significantly more teeth 12 than sensor wheel 1 on camshaft 4. A crankshaft sensor wheel typically has 60-2 teeth 12 but a different number of teeth 12 may also be selected as an alternative. For reasons of simplicity, the number of teeth 12 in FIG. 1 is shown only symbolically. Instead of a Hall sensor, a sensor which operates according to a different principle, for example, an inductively operating sensor, may also be used as an alternative.

In combination with the fact that in a four-cycle engine, crankshaft 5 passes over twice as much angle as camshaft 4 in the same amount of time, the large number of teeth 12 on crankshaft sensor wheel 5 permits a precise determination of the actual angle even without the use of extrapolation. Alternatively, extrapolation may also be used for determining the actual angular position of crankshaft 5, so that linear extrapolations, for example, or extrapolations using nonlinear functions may also be used.

Camshaft 4 and crankshaft 5 are connected via a transmission arrangement 10, for example, a cam belt.

In addition to the signals of the two Hall sensors 6 and 13 mentioned above, engine control unit 7 also processes signals of at least one additional sensor 9, which transmits information about at least one performance characteristic of the camshaft adjuster to the engine control unit. This at least one performance characteristic may be, for example, an input variable of the camshaft adjuster such as an oil temperature, a water temperature or a rotational speed of the internal combustion engine, for example. However, the at least one performance characteristic of the camshaft adjuster may also be an internal variable of the camshaft adjuster such as, for example, a battery voltage, a pulse duty factor or a trigger value of the mechanical component of the camshaft adjuster.

Multiple sensors 9 are advantageously used to be able to take into account multiple performance characteristics of the camshaft adjuster. For better clarity, two sensors 9 are shown in FIG. 1 as an example.

If the at least one performance characteristic of the camshaft adjuster is a physical variable, which does not change over time, such as, for example, a chamber volume, an oil flow characteristic, an inductance or an electrical resistance of a trigger valve, then sensors 9 may be omitted. Physical variables which do not change over time are advantageously stored in electronic memory medium 8 of engine control unit 7.

Figure 2:
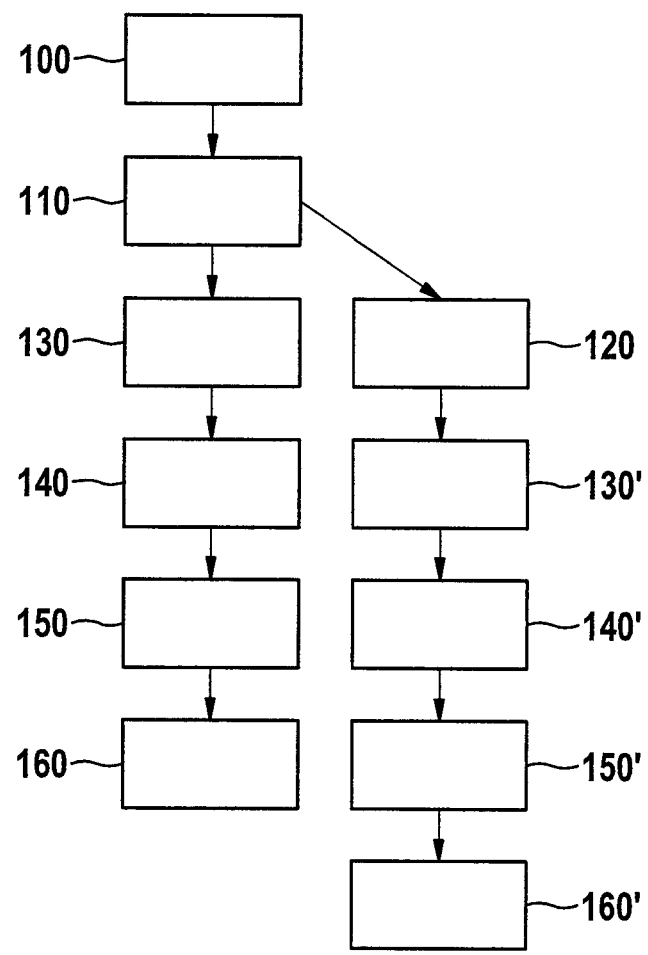
FIG. 2 shows a schematic sequence of the method according to the present invention.

FIG. 2 shows a schematic sequence of the method according to the present invention. In step 100, determination of the phase position of camshaft 4 in relation to crankshaft 5 is started at point in time t1.

In step 110, there is a check of whether a realtime phase flank interrupt triggered by sensor wheel 1 has occurred in engine control unit 7. If there has been a realtime phase flank interrupt, the sequence is continued in step 120 (see below), but if there has not been a realtime phase flank interrupt, the sequence is continued with step 130.

In step 130, the actual angular position of camshaft 4 and thus the phase position of camshaft 4 in relation to crankshaft 5 are ascertained at the point in time of occurrence of the last saved phase flank interrupt T1. Point in time T1 occurs before t1.

In step 140, the at least one performance characteristic of the camshaft adjuster is memorized. If this is a physical variable which does not change over time, it is read out of electronic memory medium 8 of engine control unit 7.

In step 150, the actual angular position of camshaft 4 is extrapolated from point in time T1 to point in time t1 on the basis of the model, which depends on at least one performance characteristic of the camshaft adjuster. The change in the angular position of camshaft 4 in the period of time from T1 to t1 is thus estimated.

With the model, which depends on at least one performance characteristic of the camshaft adjuster, there may be a functional relationship between time t and angle y, where the value of the at least one performance parameter of the camshaft adjuster enters into the function term as a factor, summand and/or exponent. The function term may be, for example, a polynomial of at least the second degree, a trigonometric function, an exponential function, a logarithmic function and/or combinations thereof.

Likewise, the model which depends on at least one performance characteristic of the camshaft adjuster may be a set of one or more differential equations. The at least one performance characteristic of the camshaft adjuster may be, for example, an integration limit or the variable by which the integration is carried out.

Alternatively, the model which depends on at least one performance characteristic of the camshaft adjuster may also be implemented in the form of characteristic lines and/or lookup tables. Likewise, combinations of function terms and characteristic lines or lookup tables are also possible.

In step 160, the result of the extrapolation from step 150 is combined with the result of the actual angle determination and thus the phase position of camshaft 4 in relation to crankshaft 5 at point in time T1 from step 130 to determine the actual angular position of camshaft 4 and thus the phase position of camshaft 4 in relation to crankshaft 5 at point in time t1. The method for determining the actual angular position of crankshaft 5 is not shown in FIG. 2. The actual angular position of crankshaft 5 is assumed to be known here. The actual angular position of camshaft 4 thus determined and the thus determined phase position of camshaft 4 in relation to crankshaft 5 are saved by the engine control unit and/or processed further (not shown in FIG. 2).

When a realtime phase flank interrupt has been detected in step 110, the actual angular position of camshaft 4 and thus the phase position of camshaft 4 in relation to crankshaft 5 are determined on the basis of the realtime phase flank interrupt (indenture number n) in step 120.

In addition, in step 120 the model for extrapolation of the actual angular position of camshaft 4, which depends on the at least one performance characteristic of the camshaft adjuster, is calibrated by running through steps 130, 140, 150 and 160. The last saved phase flank interrupt, i.e., the phase flank interrupt having indenture number n-1, is used in step 130. To characterize that steps 130, 140, 150 and 160 are run through only for calibration purposes, starting from step 120, the corresponding reference numerals are marked with an apostrophe (') in FIG. 2. The thus obtained extrapolated phase position of camshaft 4 in relation to crankshaft 5 is compared with the phase position of camshaft 4 determined from realtime phase flank interrupt n in relation to crankshaft 5. On the basis of this comparison, the model, which depends on at least one performance characteristic of the camshaft adjuster, is calibrated.

The actual angular position of camshaft 4 determined from realtime phase flank interrupt n and the thus ascertained phase position of camshaft 4 in relation to crankshaft 5 are saved and/or processed further by the engine control unit (not shown in FIG. 2).

Figure 3:
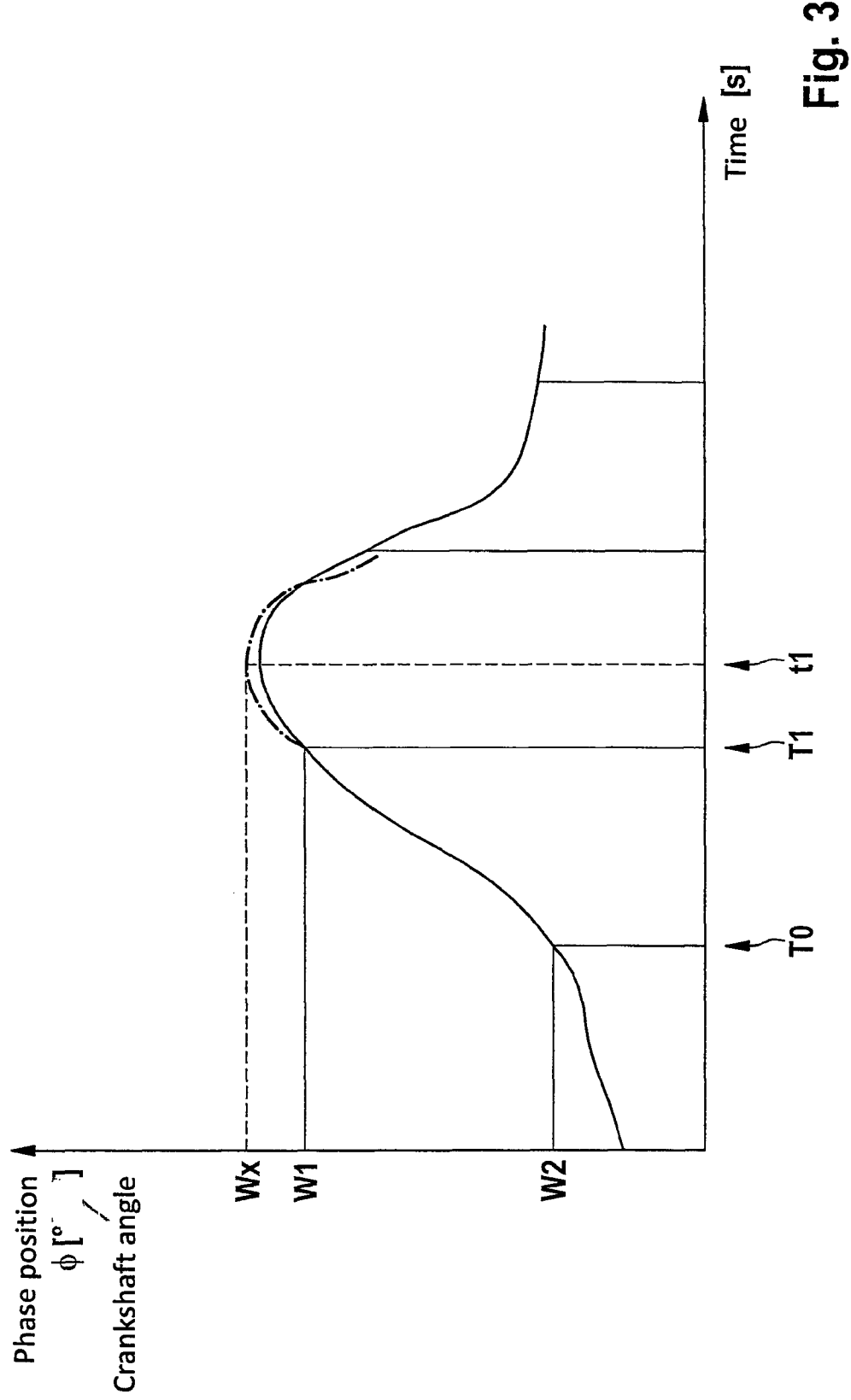
FIG. 3 shows a schematic diagram of the phase position of an adjustable camshaft in relation to the crankshaft as a function of time including an extrapolation, which was carried out with the aid of the model which depends on at least one performance characteristic of the camshaft adjuster.

FIG. 3 shows a schematic curve of the phase position of camshaft 4 in relation to crankshaft 5 as a function of time (solid line). At points in time T0 and T1, there are phase flank interrupts, which are triggered by sensor wheel 1 situated on camshaft 4. The phase positions of camshaft 4 in relation to crankshaft 5 ascertained at points in times T0 and T1 are identified as W2 and W1.

At a desired point in time, which is identified as t1 in FIG. 3, the method according to the present invention is started. It should be pointed out that the choice of point in time t1 is not restricted by the method according to the invention. The position of t1 on the time axis in relation to the points in time T0 and T1 of the phase flank interrupts is selected arbitrarily in FIG. 3.

In step 110, there is a check as to whether a realtime phase flank interrupt has occurred at point in time t1. In the example shown in FIG. 3, this is not the case since t1 comes chronologically after T1. A realtime phase flank interrupt occurs when t1 is equal to T1 within a certain small chronological tolerance. The exact value for such a chronological tolerance advantageously corresponds to the computation grid used for calculating the model and is to be optimized empirically, if necessary. For example, a chronological tolerance of 5 ms is conceivable.

In step 130, the actual angle of camshaft 4 and thus the phase position of camshaft 4 in relation to camshaft 5 are determined at the point in time of the last phase flank interrupt saved in engine control unit 7. Phase position W1 is therefore assigned to point in time T1.

In step 150, the actual angular position of camshaft 4 and thus the phase position of camshaft 4 in relation to crankshaft 5 are extrapolated from point in time T1 to point in time t1 with the aid of the model, which depends on at least one performance characteristic of the camshaft adjuster.

What is claimed is:

1. A method for determining a phase position of an adjustable camshaft of an internal combustion engine having a sensor wheel and a camshaft adjuster, the method comprising:
    determining a first phase position of the camshaft in relation to a crankshaft based on a phase flank interrupt triggered by the sensor wheel, wherein the phase flank interrupt is triggered at a first time point;
    extrapolating a second phase position of the camshaft in relation to the crankshaft from the first phase position, based on a model which depends on at least one performance characteristic of the camshaft adjuster, wherein the second phase position corresponds to a second time point after the first time point, and wherein the camshaft is synchronized to the crankshaft based on the extrapolated second phase position.

2. The method of claim 1, wherein the phase flank interrupts triggered by the sensor wheel are used for calibration of the model.

3. The method of claim 1, wherein the second time point is between the points in time of the phase flank interrupt and a subsequent phase flank interrupt triggered by the sensor wheel.

4. The method of claim 1, wherein the at least one performance characteristic of the camshaft adjuster is a temperature supplied as an input variable to the camshaft adjuster.

5. The method of claim 1, wherein the at least one performance characteristic of the camshaft adjuster is a rotational speed supplied as an input variable to the camshaft adjuster.

6. The method of claim 1, wherein the at least one performance characteristic of the camshaft adjuster is a battery voltage used as an internal control variable by the camshaft adjuster.

7. The method of claim 1, wherein the at least one performance characteristic of the camshaft adjuster is a pulse duty factor used as an internal control variable by the camshaft adjuster.

8. A computer readable medium having a computer program, which is executable by a processor, comprising:
    a program code arrangement having program code for determining a phase position of an adjustable camshaft of an internal combustion engine having a sensor wheel and a camshaft adjuster, by performing the following:
    determining a first phase position of the camshaft in relation to a crankshaft based on a phase flank interrupt triggered by the sensor wheel, wherein the phase flank interrupt is triggered at a first time point; and
    extrapolating a second phase position of the camshaft in relation to the crankshaft from the first phase position, based on a model which depends on at least one performance characteristic of the camshaft adjuster, wherein the second phase position corresponds to a second time point after the first time point, and wherein the camshaft is synchronized to the crankshaft based on the extrapolated second phase position.

9. The computer readable medium of claim 8, wherein the phase flank interrupts triggered by the sensor wheel are used for calibration of the model.

10. An electronic control unit, comprising:
a computer readable medium having a computer program, which is executable by a processor, including:
a program code arrangement having program code for determining a phase position of an adjustable camshaft of an internal combustion engine having a sensor wheel and a camshaft adjuster, by performing the following:
determining a first phase position of the camshaft in relation to a crankshaft based on a phase flank interrupt triggered by the sensor wheel, wherein the phase flank interrupt is triggered at a first time point; and
extrapolating a second phase position of the camshaft in relation to the crankshaft from the first phase position, based on a model which depends on at least one performance characteristic of the camshaft adjuster, wherein the second phase position corresponds to a second time point after the first time point, and the camshaft is synchronized to the crankshaft based on the extrapolated second phase position.

* * * * *